(12) United States Patent
Kaupp

(10) Patent No.: US 7,819,966 B2
(45) Date of Patent: Oct. 26, 2010

(54) SURFACE-COATED PEARLESCENT PIGMENTS, PROCESS FOR PREPARING THEM, AND THEIR USE

(75) Inventor: Günter Kaupp, Neuhaus (DE)

(73) Assignee: Eckart GmbH (DE)

( * ) Notice: Subject to any disclaimer, the term of this patent is extended or adjusted under 35 U.S.C. 154(b) by 0 days.

(21) Appl. No.: 11/248,530

(22) Filed: Oct. 12, 2005

(65) Prior Publication Data

US 2007/0032574 A1 Feb. 8, 2007

Related U.S. Application Data

(60) Provisional application No. 60/706,368, filed on Aug. 8, 2005.

(30) Foreign Application Priority Data

Aug. 5, 2005 (DE) ........................ 10 2005 037 612

(51) Int. Cl.
C04B 14/00 (2006.01)
A61K 9/16 (2006.01)
A61K 9/00 (2006.01)
A61K 8/02 (2006.01)
A61K 8/18 (2006.01)

(52) U.S. Cl. ........................ 106/400; 424/490; 424/489; 424/401; 424/59

(58) Field of Classification Search ................ 524/127; 427/212; 106/400; 424/490, 489, 401, 59
See application file for complete search history.

(56) References Cited

U.S. PATENT DOCUMENTS

| 5,466,482 | A | * | 11/1995 | Johnson ...................... 427/212 |
| 5,837,049 | A | * | 11/1998 | Watson et al. ................ 106/427 |
| 5,856,378 | A | * | 1/1999 | Ring et al. ................... 523/205 |
| 6,508,876 | B1 | * | 1/2003 | Bernhardt et al. ........... 106/415 |
| 6,533,857 | B1 | * | 3/2003 | Schmid et al. .............. 106/403 |
| 6,699,313 | B2 | * | 3/2004 | Coulter et al. ............. 106/31.6 |
| 6,713,543 | B2 | * | 3/2004 | El-Shoubary et al. ....... 524/127 |
| 6,765,041 | B1 | * | 7/2004 | El-Shoubary et al. ....... 523/205 |
| 2003/0147820 | A1 | * | 8/2003 | Bertaux et al. ................ 424/63 |
| 2004/0228980 | A1 | * | 11/2004 | Wissing et al. .............. 427/508 |
| 2004/0265348 | A1 | * | 12/2004 | Hollenberg et al. ......... 424/401 |

FOREIGN PATENT DOCUMENTS

| DE | 12 34 234 B | 2/1967 |
| DE | 197 08 167 A1 | 9/1998 |
| DE | 198 20 112 A1 | 11/1999 |
| DE | 696 25 650 T2 | 11/2003 |
| EP | 0 268 918 A1 | 6/1988 |
| EP | 0285 977 A1 | 10/1988 |
| EP | 0492 223 A2 | 7/1992 |
| EP | 0 675 176 A2 | 10/1995 |
| EP | 0 707 051 A1 | 4/1996 |
| EP | 0721 005 A1 | 7/1996 |
| JP | 10-298450 | * 10/1998 |
| WO | WO 2004/092284 A1 | 10/2004 |

* cited by examiner

*Primary Examiner*—Jerry Lorengo
*Assistant Examiner*—Shuangyi Abu Ali
(74) *Attorney, Agent, or Firm*—Ostrolenk Faber LLP

(57) ABSTRACT

The invention relates to surface-modified pearlescent pigments, the pearlescent pigments being provided on the surface with at least one organic phosphorus compound of the general formula (I)

$$R^1R^2P(O)(OR^3) \qquad (I)$$

and/or of the general formula (II)

$$R^1P(O)(OR^3)(OR^4) \qquad (II)$$

where
$R^1$ and $R^2$ independently of one another are hydrogen or an organic radical having 1 to 30 carbon atoms, with the proviso that $R^1$ and $R^2$ are not simultaneously hydrogen,
$R^3$ and $R^4$ independently of one another are H or alkyl having 1-10 carbon atoms. The invention further relates to a process for preparing these pearlescent pigments and also to their use.

22 Claims, No Drawings

SURFACE-COATED PEARLESCENT PIGMENTS, PROCESS FOR PREPARING THEM, AND THEIR USE

CROSS REFERENCE TO RELATED APPLICATIONS

This application claims priority under 35 U.S.C. §119(e) of U.S. Provisional Patent Application No. 60/706,368 filed on Aug. 8, 2005, and of German Patent Application No. 102005037612.6, filed on Aug. 5, 2005, the contents of which are hereby incorporated by reference.

FIELD OF THE INVENTION

The invention relates to surface-modified pearlescent pigments coated with organic phosphonic acids, organic phosphinous acids and/or esters thereof. The invention further relates to a process for preparing these surface-modified pearlescent pigments and also to their use.

BACKGROUND OF THE INVENTION

For a number of years, powder coating materials have been much used for coating surfaces. These coating materials are finely divided polymeric powders which can be applied by a variety of techniques. For example, the powder coating material can be sprayed by electrostatic charging onto the part that is to be coated, and which carries an opposite charge, in which case a thin film is formed which is cured by heating to the powder's softening point. Another possible means of application is that of tribostatic application (charging by friction in the spraygun). Powder coating materials possess the advantage over conventional, solvent-based coating systems of causing no solvent emissions whatsoever and, by virtue of their recyclability, of having virtually no overspray. Powder coating materials can be pigmented with color pigments and effect pigments such as metallic effect pigments or pearlescent (or pearl luster) pigments in order to achieve decorative effects.

Common organic or inorganic pigments and also customary powder coating ingredients, such as binders, curing agents, fillers, additives, etc., are first premixed in a mixer and then extruded. The chips obtained in this procedure are ground in a pinned-disk mill or impact-lining mill or similar equipment.

Where platelet-shaped effect pigments, such as pearlescent pigments or metallic effect pigments, for example, are used in powder coating materials, they must be incorporated into the powder coating material in a relatively gentle process. Otherwise the pigments, which are sensitive to shearing, undergo fracture and so lose their characteristic properties.

Two processes of incorporation are conventional in industrial practice. In the case of the first process, the dry-blend process, the powder coating particles and the effect pigments are simply mixed with one another. A disadvantage of this process is the presence of powder coating particles and effect pigment particles as separate entities. Owing to the difference in shape and chemical nature of powder coating particles and effect pigments, separation phenomena are frequently encountered in the course of electrostatic application. Accompanying this is a loss of recyclability of the unapplied powder coating material, owing to a relative change in the proportions of powder coating particles to effect pigments in the powder coating material. Re-using the unapplied powder coating material in a new powder coating would lead to a coating film of altered quality. Furthermore, in the powder coating gun, particle aggregates may develop, which lead to large aggregates ("spits") on the coating and hence to an unacceptable visual appearance. The second process is referred to as bonding. Here, in the presence of the pearlescent pigment, the powder coating material is heated to just a little way below its glass temperature and hence is partially melted. This results in physical adhesion of the pearlescent pigments to the powder coating particles and hence in the formation of composite particles. By this means, as a general rule, the disadvantages accompanying dry blending are alleviated. However, the bonding operation is generally incomplete: within the powder coating there remain individual pearlescent pigments not joined to the binder. A further disadvantage is that this process is applicable only poorly in the case of fractions with relatively large pearlescent pigments. Here, in comparison to the powder coating binder particles, the pearlescent pigments are so large that only some adhere firmly enough.

EP 0 721 005 B1 describes pigment preparations comprising pearlescent pigments, a phosphate derivative, and spherical particles. Such preparations are said to bring advantages particularly in the printing sector. Applications in powder coating materials or bronze-effect finishes have not been described.

Pearlescent pigments coated with long-chain saturated fatty acids are disclosed in EP 0 285 977 B1. Such pearlescent pigments possess leafing properties and can be used with advantage in bronze-effect finishes.

Pearlescent pigments coated with alkylsilanes and having leafing properties are described in EP 0 492 223 B1. These pigments are to be used for inhibiting the yellowing of pigmented plastics.

These two known surface-modified pearlescent pigments having leafing properties, however, exhibit disadvantages in powder coating materials. The optical effects such as luminance or flop are not substantially enhanced. Only at very high levels of fatty acids or alkylsilanes is a strong leafing behavior and hence a greater visual brilliance obtained. Here, however, the abrasion resistance is deficient. Alkylsilane-coated pearlescent pigments cannot be applied, furthermore, with sufficient reproducibility.

DE 197 08 167 A1 discloses a pigment preparation comprising, among other components, surface-active substances, such as fatty acids and fluorosurfactants. The use of surface-active substances is intended to produce nondusting, homogeneous pigment preparations.

SUMMARY OF THE INVENTION

It is an object of the present invention to provide pearlescent pigments which do not exhibit the aforementioned disadvantages of the known pigments when employed in powder coating materials. In the powder coating material the pearlescent pigments ought to display good processing properties, in the powder coating they ought to possess effective orientation, and in the coating produced by powder coating they ought to exhibit enhanced brilliance, luminance and flop.

A further object is to find a simple, cost-effective process for preparing pearlescent pigments of this kind.

The object has been achieved through the provision of surface-modified pearlescent pigments whose surface has been provided with at least one organic phosphorus compound of the general formula (I)

$$R^1R^2P(O)(OR^3) \qquad (I)$$

and/or of the general formula (II)

where
R¹ and R² independently of one another are hydrogen or an organic radical having 1 to 30 carbon atoms, with the proviso that R¹ and R² are not simultaneously hydrogen, and
R³ and R⁴ independently of one another are H or alkyl having 1-10 carbon atoms.

DETAILED DESCRIPTION OF THE INVENTION

Compounds of the general formula (I) are organic derivatives of phosphinous acid, referred to as organic phosphinous acid, in which the organic radicals R¹ and R² are attached directly to the phosphorous atom. If the radical R³ is alkyl having 1 to 10 carbon atoms, the organic derivative is an ester of phosphinous acid. If R³ is hydrogen, it is an organic derivative of the free phosphinous acid.

Compounds of the general formula (II) are organic derivatives of phosphonic acid, referred to as organic phosphonic acid, in which the organic radical R¹ is attached directly to the phosphorus atom. If the radicals R³ and R⁴ are alkyl having 1 to 10 carbon atoms, the derivative in question is an organic derivative of a diester of phosphonic acid. If R³ is hydrogen and R⁴ is alkyl having 1 to 10 carbon atoms, it is an organic derivative of a monoester of phosphonic acid. If R³ and R⁴ are hydrogen, the derivative in question is an organic derivative of the free phosphonic acid.

It has surprisingly emerged that the pearlescent pigments of the invention not only possess good performance properties such as effective leveling and good processing properties but also exhibit a strong floating behavior in conjunction with excellent parallel orientation in the powder coating material, as a result of which, with an improved optical effect, a lower level of pigmentation than usual is possible. By virtue of the relatively low level of pigmentation, i.e., a lower amount of pigment in the powder coating material, considerable cost savings can be made for a comparable or improved visual appearance. Furthermore, the brilliance and luminance, and also the luminance flop, are sharply increased as compared with conventional pearlescent pigments.

The pearlescent pigments of the invention have a surface coating of 0.05% to 10% by weight of organic phosphinous acid and/or organic phosphonic acid and/or esters thereof. In accordance with the invention it is also possible to use mixtures of organic phosphinous acids and/or organic phosphonic acids and/or their respective esters. According to one embodiment the surface modification is made using an organic phosphinous acid or an organic phosphonic acid or its respective ester.

The remarks below are therefore to be understood to the effect that, in lieu of an individual organic phosphinous acid or an individual organic phosphonic acid and/or their esters it is in each case also possible to use mixtures, and vice versa.

The proportion of organic phosphinous acid and/or organic phosphonic acid and/or esters thereof is preferably 0.1% to 5% by weight and more preferably 0.5% to 3% by weight, based in each case on the weight of total pearlescent pigment. At amounts of less than 0.1% by weight the effect of the organic phosphinous acid and/or phosphonic acid and/or esters thereof may be too low, while above 10% by weight the surface of the pearlescent pigments becomes too hydrophobic, so that disbanding phenomena and an incipient lack of abrasion resistance occur in the powder coating material.

The pearlescent pigments of the invention have an average pigment size of 1 to 400 μm, preferably of 2 to 150 μm, and more preferably of 5 to 50 μm. The stated pigment size is the average length of the pearlescent pigments.

Pearlescent pigments which can be used include all common commercially available pigments.

The pearlescent pigments have a platelet-shaped substrate selected preferably from the group consisting of mica, talc, sericite, kaolin, and SiO₂, glass, graphite, and Al₂O₃ flakes, and mixtures thereof. Preferred substrates in this case are mica and flakes of SiO₂, glass or Al₂O₃.

Deposited atop this platelet-shaped substrate of low refractive index are further layers, preferably of high refractive index. Layers of this kind are selected preferably from the group consisting of metal chalcogenides, especially metal oxides, metal hydroxides, metal oxide hydrates, metal suboxides, and metal sulfides, metal fluorides, metal nitrides, metal carbides, and mixtures thereof.

The substrates of the pearlescent pigments are preferably coated with a multilayer system comprising or consisting of metal oxide, metal hydroxide, metal suboxide and/or metal oxide hydrate, the sequence of the layers being variable. The metal oxides, metal hydroxides, metal suboxides and/or metal oxide hydrates may also be present alongside one another in the same layer.

The substrates of the pearlescent pigments are preferably coated with one or more metal oxide layers from the group consisting of or comprising TiO₂, Fe₂O₃, Fe₃O₄, TiFe₂O₅, ZnO, SnO₂, CoO, Co₃O₄, ZrO₂, Cr₂O₃, VO₂, V₂O₃, (Sn,Sb)O₂, and mixtures thereof. Particular preference is given to TiO₂ and/or Fe₂O₃.

In one further embodiment the multilayer system features a layer sequence in which at least one layer of high refractive index and at least one layer of low refractive index are disposed alternatingly on a substrate.

In the case of alternate disposition it is also possible for one or more layers of high refractive index to be disposed directly atop one another and, thereafter, for one or more layers of low refractive index to be disposed directly atop one another. It is essential, however, that layers of high and of low refractive index are present in the layer system.

It is preferred for the multilayer system to feature a layer sequence in which at least one layer of high refractive index, at least one layer of low refractive index, and at least one layer of high refractive index are disposed in succession on a substrate.

In the case of this version as well it is possible for one or more layers of low and/or of high refractive index to be disposed in each case directly atop one another. It is essential, however, that within the layer system, from inside to outside, layers of high, of low, and again of high refractive index are disposed.

Preferably at least one layer of high refractive index comprises or consists of metal oxide and/or metal hydroxide from the group consisting of TiO₂, Fe₂O₃, Fe₃O₄, TiFe₂O₅, ZnO, SnO₂, CoO, Co₃O₄, ZrO₂, Cr₂O₃, VO₂, V₂O₃, (Sn,Sb)O₂, and mixtures thereof. The layer of low refractive index comprises or consists preferably of metal oxide and/or metal hydroxide from the group consisting of SiO₂, Al₂O₃, and mixtures thereof.

Pearlescent pigments which have layers of high and low refractive index produce particularly intense interference colors. In particular, pearlescent pigments having a layer of high refractive index, a layer of low refractive index, and another layer of high refractive index are particularly preferred. A layer sequence comprising or consisting of TiO₂/SiO₂/TiO₂ and also, optionally, a layer comprising Fe$_2$O$_3$ produces intense golden hues and is particularly preferred.

Pearlescent pigments having the above layer sequence are produced by Merck and sold under the trade name Iriodin Stargold.

In another embodiment the pearlescent pigments consist of glass flake substrates coated on both sides with semitransparent metal layers.

The metals of the semitransparent metal layers are preferably selected from the group consisting of silver, aluminum, chromium, nickel, gold, platinum, palladium, copper, zinc, and mixtures and alloys thereof. The thicknesses of the semi-transparent layers are situated preferably in a range from about 2 to about 30 nm, more preferably from about 5 to about 20 nm.

The aforementioned pearlescent pigments can of course additionally be coated with further protective layers. This may further improve the stability of the pearlescent pigments with respect to weather effects. Mention may be made here in particular of the photocatalytic activity of pearlescent pigments comprising TiO$_2$ layers, which can be suppressed by means of suitable protective layers.

According to one preferred version of the present invention the substrates of the pearlescent pigments that are coated with one or more layers comprising or consisting of metal chalcogenide(s), particularly metal oxide(s), metal hydroxide(s), metal oxide hydrate(s), metal suboxide(s), and metal sulfide(s), metal fluoride(s), metal nitride(s), metal carbide(s) or mixtures thereof, are additionally coated envelopingly with at least one outer protective layer comprising or consisting of metal oxide and/or metal hydroxide and/or metal oxide hydrate of metals selected from the group consisting of silicon, aluminum, cerium, manganese, zirconium, and mixtures thereof, the at least one organic phosphorus compound of the general formula (I) and/or (II) being applied to the outer, enveloping protective layer. In a further embodiment the pearlescent pigments are composed of a single platelet-shaped material, the material being selected from the group consisting of bismuth oxichloride, TiO$_2$, and Fe$_2$O$_3$.

By way of example it is possible to use the pearlescent pigments sold by Merck KGaA, Darmstadt, Germany under the brand names Iriodin®, Florapearl®, Solarflair®, Lazerflair™, Biflair®, Minatec®, Miraval®, Xirallic® or Colorstream®, those sold by Engelhard, USA under the brand names Mearlin® or Exterior Mearlin®, and those sold by Eckart under the brand names Prestige® or Phoenix®.

In further embodiments, the aforementioned pearlescent pigments may also be coated with color pigments. By this means it is possible to obtain more intense colors and, in particular, two-tone pearlescent pigments. Examples of such are the pearlescent pigments sold by Engelhard under the trade name Dynacolor.

The at least one organic phosphorus compound has the general formula (I)

$$R^1R^2P(O)(OR^3) \quad (I)$$

and/or the general formula (II)

$$R^1P(O)(OR^3)(OR^4) \quad (II)$$

where R$^1$ and R$^2$ independently of one another are hydrogen or an organic radical having 1 to 30 carbon atoms, with the proviso that R$^1$ and R$^2$ are not simultaneously hydrogen, and R$^3$ and R$^4$ independently of one another are H or alkyl having 1-10 carbon atoms.

It is preferred here for R$^3$ and R$^4$ independently of one another to be H, methyl or ethyl. In one preferred development R$^3$ and R$^4$ are the same.

The organic radicals R$^1$ and R$^2$ may independently of one another be C$_1$-C$_{30}$ alkyl, C$_2$-C$_{30}$ alkenyl, C$_2$-C$_{30}$ alkynyl; C$_6$-C$_{30}$ aryl, C$_7$-C$_{30}$ alkylaryl, C$_7$-C$_{30}$ arylalkyl, C$_8$-C$_{30}$ alkenylaryl, C$_8$-C$_{30}$ arylalkynyl, C$_8$-C$_{30}$ alkynylaryl; C$_5$-C$_{30}$ cycloalkyl, C$_5$-C$_{30}$ alkyl-cycloalkyl or C$_5$-C$_{30}$ cycloalkylalkyl groups. The radicals R$^1$ and R$^2$ may independently of one another be branched or unbranched. Preference is given to alkyl radicals having 4 to 20 and particular preference to alkyl radicals having 6 to 18 carbon atoms, the radicals each being preferably unbranched. According to one preferred version R$^1$ and R$^2$ are the same. The carbon chains may include heteroatoms, preferably O, S and/or N.

In one particularly preferred embodiment R$^3$ and R$^4$ are hydrogen and R$^1$ is an alkyl radical having 6 to 18 carbon atoms which is preferably unbranched. Examples thereof are the readily commercially available octanephosphonic acid (e.g., from Rhodia) or dodecyl-phosphonic acid.

The use of phosphonic acids as stabilizers has been known for a very long time in connection with metal pigments. In the case of aluminum pigments in particular it is possible for organic phosphonic acids and/or their esters to serve as anti-corrosion agents in order to prevent gassing (evolution of hydrogen) on contact with water. The phosphonic acid group is known to be a particularly good anchor group on aluminum surfaces, which are always coated with a natural oxide layer.

It has now been found, surprisingly, that the surfaces of pearlescent pigments, which in general are composed of entirely different materials, are readily coated by organic phosphinous acids and/or organic phosphonic acids and/or their esters. This was not to have been expected, particularly since the organic phosphinous acids and/or organic phosphonic acids and/or their esters must apparently undergo adsorption to a very wide variety of different oxides. Owing to their preparation process, which always includes steps of calcination, pearlescent pigments frequently have surfaces poor in OH groups. It is OH groups specifically, however, to which organic phosphinous and/or organic phosphinic acids and/or their esters exhibit preferential attachment. Hence it was extremely surprising that organic phosphinous and/or organic phosphonic acids are adsorbed to such different pearlescent pigments and, accordingly, endow them with advantageous properties.

The object on which the invention is based is also achieved, furthermore, by provision of a process for preparing a pearlescent pigment of any one of claims 1 to 15, the process comprising the following steps:

(a) mixing pearlescent pigments with phosphorus compound of the general formula (I)

$$R^1R^2P(O)(OR^3) \quad (I)$$

and/or of the general formula (II)

$$R^1P(O)(OR^3)(OR^4) \quad (II)$$

where
R$^1$ and R$^2$ independently of one another are hydrogen or an organic radical having 1 to 30 carbon atoms, with the proviso that R$^1$ and R$^2$ are not simultaneously hydrogen,
R$^3$ and R$^4$ independently of one another are H or alkyl having 1-10 carbon atoms in a liquid phase, (b) separating the pearlescent pigments from the liquid phase and, where appropriate, from excess organic phosphorus compound, (c) optionally, drying the surface-modified pearlescent pigments.

In the course of the mixing of pearlescent pigment and phosphorus compound having the general formula (I) and/or (II) the phosphorus compound binds to the surface of the pearlescent pigment. The binding of the phosphorus compound to the pigment surface may take place by means of chemical binding and/or by means of adhesion.

In the context of this process the pearlescent pigments may first be pasted or dispersed in a solvent and then the organic phosphinous acid and/or the organic phosphinic acid and/or esters thereof may be added. It is, however, also possible first to dissolve or disperse the organic phosphinous acid and/or the organic phosphonic acid and/or their esters in a solvent and then to add the pearlescent pigments and to stir them together with one another, or a solution of the organic phosphinous acid and/or of the organic phosphonic acid and/or of their esters is supplied to a paste comprising pearlescent pigment and solvent. The contact time of pearlescent pigment and organic phosphonic acids or their esters ought preferably to be 5 minutes to 5 hours and more preferably 15 minutes to 2 hours. The solvent can be heated to a temperature from a range from 30° C. up to its boiling point. This may improve in particular the solubility of the organic phosphinous acid and/or organic phosphonic acids and/or their esters.

Coated pearlescent pigments are separated from solvent by means of commonplace methods such as filtration, filtration with suction, decanting, etc.

Drying takes place preferably at elevated temperatures from a range from about 40 to 100° C. and optionally under reduced pressure.

The solvent in which the organic phosphinous acid(s) and/or organic phosphonic acid(s) and/or their derivatives or salts or phosphoric esters is or are soluble or dispersible is selected preferably from the group consisting of ethyl acetate, isopropyl acetate, n-propyl acetate, ethanol, isopropanol, acetone, and mixtures thereof. It is of course also possible to select other hydrocarbon-based solvents.

In another embodiment it is possible for pearlescent pigment and organic phosphonic acid to be mixed with one another even without solvent being present. A procedure of this kind may be carried out in kneading apparatus, mixers or similar devices.

The object on which the invention is based is additionally achieved through provision of a powder coating composition which comprises the pearlescent pigments of the invention.

The pearlescent pigments of the invention are outstandingly suitable for use in powder coating materials. It has emerged, however, that the pearlescent pigments of the invention can also be used in further applications. The pearlescent pigments of the invention can be used with advantage also in coatings, varnishes, printing inks, plastics or bronze-effect finishes.

In the coatings sector they can be used in automobile finishes, provided they are pearlescent pigments possessing protective layers, in coil coatings, and, in particular, in powder coating materials.

The pearlescent pigments of the invention are preferably used in powder coating materials and in bronze-effect finishes. Products of this kind additionally find use in the production of dry preparations in the form of beads, pellets, briquettes, tablets, sausages, granules, etc. These dry preparations have a moisture content of preferably less than 10% by weight, more preferably of less than 6% by weight, and with further preference of less than 4% by weight, based in each case on the total weight of the pearlescent pigment. A moisture content of 1% to 3% by weight has proven very suitable.

From the above-described pearlescent pigments of the invention, coated with organic phosphinous and/or organic phosphonic acid(s) and/or esters thereof, it is possible, by processes known to the skilled worker, to produce a powder coating material pigmented with pearlescent pigments. Production takes place, for example, by means of dry blending or bonding. Preferably 0.1% to 12%, more preferably 1% to 5%, and very preferably 2% to 4% by weight of the pearlescent pigment of the invention and, correspondingly, 88% to 99.9%, preferably 95% to 99% or 96% to 98% by weight of powder coating binder are mixed with one another in a stirred vessel under suitable conditions familiar to the skilled worker. The sum of the weight fractions of inventive pearlescent pigment and powder coating binder makes 100% by weight in each case, unless further additives are added. Heating may be carried out up to the softening temperature of the powder coating binder, preferably in a range of about 50-90° C. (bonding). The weight percentage figures here are based in each case on the total weight of the powder coating material.

The coated pearlescent pigments of the invention give powder coating materials in which, following application, the pearlescent pigments are located near to the surface, i.e., exhibit a leafing effect. This produces powder coating materials which exhibit a brilliant pearl luster effect on coated articles in conjunction with enhanced luminance and enhanced flop. When colored pearlescent pigments are used, a higher chroma is obtained. The powder coating materials thus obtained have very good processing properties and adhere outstandingly to the substrate prior to baking. In general, owing to the enhanced brilliance of the powder coating materials, less pearlescent pigment than usual can be used, which is a great economic advantage.

As powder coating binders it is possible for example to use TGIC polyesters, non-TGIC polyesters, polyurethanes, polyacrylates, epoxy resins or epoxy polyesters.

The present invention is illustrated by a number of examples, which do not, however, restrict the scope of the invention.

EXAMPLE 1

100 g of weather-stable pearlescent pigment Phoenix XT 2001 (from Eckart, with chromium hydroxide coating) are dispersed in 150 g of ethanol. 1.5 g of octane-phosphonic acid in solution in 20 g of ethanol are added and the two components are mixed homogeneously with one another by stirring for 30 minutes. After one hour of stirring at room temperature the pigment is isolated by filtration and dried in a vacuum drying oven at 40° C. for 6 to 8 hours.

EXAMPLE 2

As example 1, but using 2.5 g of octanephosphonic acid.

COMPARATIVE EXAMPLE 3

Phoenix XT 2001 without further organic aftertreatment

COMPARATIVE EXAMPLE 4

Iriodin 9119 WR: weather-stabilized pearlescent pigment (with chromium hydroxide coating) without further organic aftertreatment

COMPARATIVE EXAMPLE 5

Iriodin 9119 PC S WR: weather-stabilized pearlescent pigment with stearic acid coating

COMPARATIVE EXAMPLE 6

(Modified from EP 0 492 223 B1):

100 g of pearlescent pigment Phoenix XT 2001 are dispersed in 250 g of technical-grade ethanol and the dispersion is heated to 60° C. First 1.5 g of ethylene-diamine and, 5 minutes later, 1.5 g of Dynasylan 9116 in solution in 20 g of ethanol are added. After 2 hours of stirring at 60° C. the pigment is isolated by filtration, washed, and dried in a vacuum drying oven at 40° C. for 6 to 8 hours.

COMPARATIVE EXAMPLE 7

(Modified from EP 0 492 223 B1):

As comparative example 6, but using 2.5 g of Dynasylan 9116 and adding an additional 10 g of water with the base.

The pearlescent pigments according to inventive examples 1 and 2 and the pearlescent pigments according to comparative examples 3 to 7 were incorporated each at 3% by weight, based on the weight of the total powder coating material, into a commercially available, TGIC-free polyester powder coating material whose shade was RAL 9005 (Tiger, Wels, Austria) by means of the bonding process.

The powder coating material was applied to steel test panels by means of the corona process at a voltage of 70-80 kV using the ITWGema PG1 and then baked at 200° C. for 10 minutes.

The luminance and flop of powder coatings cannot be characterized reproducibly with the calorimetric measurements that are usual in the case of wet surface coatings, since with powder coating materials reproducibility does not exist to the same degree. Consequently the luminance and flop of the test panels were assessed visually. The test panels in this case were characterized, along the lines of DIN 53230, using a rating system. The meanings of the numerical ratings are as follows:

0: very good
1: good
2: satisfactory
3: acceptable
4: unacceptable
5: completely unacceptable Furthermore, a measurement was made of the luminance, by means of a calorimeter (Minolta CM-508E). The parameter detected in this measurement is the diffuse reflection, which reproducibly mirrors the visual impression of luminance in a realistic fashion.

Furthermore, by analysis, the carbon content of the samples was determined by means of elemental analysis and was compared with the theoretically possible value. On the assumption that the measured carbon content originates exclusively from the organic surface modification, it is possible in this way, with reference to the amounts and molecular weights of the modifiers employed and to the carbon content theoretically present, to calculate the actual amount thereof.

The carbon contents, the calculated amount of surface modifier, and the data of the colorimetric and visual assessment of coated metal test panels are summarized in tab. 1.

TABLE 1

Examples with carbon contents and optical properties of metal test panels coated with powder coating material produced by a bonding process

| Samples | C content$_{theo}$ [% by wt.] | C content$_{analyt}$ [% by wt.] | Amount of surface modification [% by wt.] | L* | Visual assessment Luminance | Flop |
|---|---|---|---|---|---|---|
| Example 1 | 0.75 | 0.67 | 1.3 | 55.6 | 1 | 1 |
| Example 2 | 1.25 | 0.85 | 1.8 | 54.0 | 2 | 1 |
| Compar. example 3 | — | — | — | 49.7 | 2 | 3 |
| Compar. example 4 | — | — | — | 48.8 | 3 | 3 |
| Compar. example 5 | — | — | — | 49.2 | 3 | 2 |
| Compar. example 6 | 0.83 | 0.63 | 1.1 | 50.9 | 3 | 2 |
| Compar. example 7 | 1.38 | 1.04 | 1.9 | 52.3 | 2 | 1 |

The luminance values of coated metal test panels that were found are the highest when the inventively coated pearlescent pigments are used in the powder coating material. This is in agreement with the visual impression of an increased luminance. In terms of a combination of visually assessed luminance and flop, the inventive examples likewise achieve the best score.

In the sample coatings on the metal test panels, the poorest are the commercially available pearlescent pigments of comparative examples 4 and 5. Accordingly, coating with stearic acid appears not to provide any substantial advantages for pearlescent pigments in the powder coating material as compared with an untreated pearlescent pigment.

Treatment of pearlescent pigments with alkylsilanes (see comparative examples 6 and 7) improves the visual appearance in respect of luminance and flop as compared with an untreated pearlescent pigment (see comparative example 3) significantly in the case of the sample coatings on metal test panels. However, the luminance and flop behavior of the pearlescent pigments of the inventive examples are significantly more intense still and so produce a significantly advantageous appearance as compared with the comparative examples.

EXAMPLE 8

As example 1, but using Exterior Mearlin Mayan Gold 233 X (Engelhard) as pearlescent pigment and coating with 1.0% by weight of octanephosphonic acid.

COMPARATIVE EXAMPLE 9

The pearlescent pigment Exterior Mearlin Mayan Gold 233 X without further aftertreatment.

EXAMPLE 10

As example 1, but using Exterior Mearlin Super Blue 639 Z (Engelhard) as pearlescent pigment and coating with 1.0% by weight of octanephosphonic acid.

COMPARATIVE EXAMPLE 11

The pearlescent pigment Exterior Mearlin Super Red 439 Z (Engelhard) is used.

EXAMPLE 12

As example 1, but using Exterior Mearlin Super Red 439 Z (Engelhard) as pearlescent pigment and coating with 1.0% by weight of octanephosphonic acid.

COMPARATIVE EXAMPLE 13

As example 1, but using Exterior Mearlin Super Red 439 Z (Engelhard) as pearlescent pigment.

The pearlescent pigment produced in accordance with inventive examples 8, 10, and 12 and the pearlescent pigments produced in accordance with comparative examples 9, 11, and 13 were each used, as described above, in a powder coating material and applied to metal test panels. Subsequently, using the colorimeter, the luminance and the chroma were determined for the sample coatings. Tab. 2 depicts the results.

TABLE 2

Luminance and chroma of different colored powder coatings produced on metal test panels using inventive pearlescent pigments and noninventive pearlescent pigments.

| Sample | Luminance L* | Chroma C* |
|---|---|---|
| Example 8 | 32.2 | 6.5 |
| Comparative example 9 | 27.5 | 0.4 |
| Example 10 | 30.0 | 6.8 |
| Comparative example 11 | 27.5 | 2.7 |
| Example 12 | 27.9 | 5.0 |
| Comparative example 13 | 27.4 | 2.0 |

A comparison shows that the sample coatings on metal test panels produced using the inventively coated pearlescent pigments exhibit a significantly higher chroma and higher luminances than those using the noninventive pearlescent pigments. The higher chroma and the higher luminance are attributable to the stronger floating of the inventive pearlescent pigments in the coating film produced by powder coating, i.e., a disposition of the inventive pearlescent pigments at or near to the surface (leafing effect) of the coating film. By virtue of the disposition of the pearlescent pigments at or near the surface of the coating film, improved orientation parallel to the surface is produced.

What is claimed is:

1. A dry powder coating composition that comprises surface-modified pearlescent pigments and powder coating binder, each said surface modified pearlescent pigment comprising:
   a pearlescent pigment comprised of a platelet-shaped substrate of one refractive index and an optically transmissive inorganic body of another refractive index higher than the one refractive index deposited atop the substrate, the pearlescent pigment having over a surface thereof at least one organic phosphorus compound of the general formula (I)

$$R^1R^2P(O)(OR^3) \quad (I),$$ or of the general formula (II)

$$R^1P(O)(OR^3)(OR^4) \quad (II),$$ or a combination thereof
   where
   $R^1$ and $R^2$ independently of one another are hydrogen or an organic radical having 1 to 30 carbon atoms, with the proviso that $R^1$ and $R^2$ are not simultaneously hydrogen, $R^3$ and $R^4$ independently of one another are H or alkyl having 1-10 carbon atoms;
   wherein said dry powder coating composition includes 0.1% to 12% of surface modified pearlescent pigments by weight and 88% to 99.9% of powder coating binder by weight, said surface modified pearlescent pigments and said powder coating binder being bonded, wherein said surface modified pearlescent pigments and said powder coating binder are bonded by mixing and heating up to the softening temperature of said powder coating binder, and wherein said dry powder coating composition when applied exhibits a higher chroma value than a powder coating composition containing an identical amount of said pearlescent pigment without an organic phosphorus compound of the general formula I or general formula II over a surface thereof.

2. The powder coating composition of claim 1, wherein each pearlescent pigment contains 0.05% to 10% by weight of the at least one organic phosphorus compound of the general formula (I), (II), or a combination thereof, the percent by weight figure being based on the total weight of the pearlescent pigment.

3. The powder coating composition of claim 1, wherein the size of the pearlescent pigments is in the range of 1 to 400 μm.

4. The powder coating composition of claim 1, wherein each pearlescent pigment has a substrate selected from the group consisting of mica, talc, sericite, kaolin, and $SiO_2$, glass, graphite, and $Al_2O_3$ flake.

5. The powder coating composition of claim 4, wherein the substrates of the pearlescent pigment have been coated with one or more layers selected from the group consisting of metal chalcogenides, metal hydroxides, metal oxide hydrates, metal suboxides, metal fluorides, metal nitrides, metal carbides, and mixtures thereof.

6. The powder coating composition of claim 4, wherein the substrates of the pearlescent pigments have been coated with a multilayer system comprising metal oxide, metal hydroxide, metal suboxide, metal oxide hydrate, or a combination thereof, the sequence of the layers being variable.

7. The powder coating composition of claim 5, wherein the substrates of the pearlescent pigments have been coated with one or more metal oxide layers selected from the group consisting of $TiO_2$, $Fe_2O_3$, $Fe_3O_4$, $TiFe_2O_5$, ZnO, $SnO_2$, CoO, $Co_3O_4$, $ZrO_2$, $Cr_2O_3$, $VO_2$, $V_2O_3$, $(Sn,Sb)O_2$, and mixtures thereof.

8. The powder coating composition of claim 6, wherein the multilayer system further comprises a layer sequence in which at least one layer of high refractive index and at least one layer of low refractive index are disposed alternatingly on a substrate.

9. The powder coating composition of claim 6, wherein the multilayer system further comprises a layer sequence in which at least one layer of high refractive index, at least one layer of low refractive index, and at least one layer of high refractive index are disposed in succession on a substrate.

10. The powder coating composition of claim 8, wherein the at least one layer of high refractive index comprises at least one metal oxide; at least one metal hydroxide wherein said metal oxide is selected from the group consisting of $TiO_2$, $Fe_2O_3$, $Fe_3O_4$, $TiFe_2O_5$, ZnO, $SnO_2$, CoO, $Co_3O_4$, $ZrO_2$, $Cr_2O_3$, $VO_2$, $V_2O_3$, $(Sn,Sb)O_2$, and mixtures thereof; or a combination thereof and the layer of low refractive index comprises at least one metal oxide; at least one metal hydroxide; or a combination thereof.

11. The powder coating composition of claim 4, wherein the pearlescent pigments comprise glass flakes coated on both sides with semitransparent metal layers.

12. The powder coating composition of claim 11, wherein the metals of the semitransparent metal layers are selected from the group consisting of silver, aluminum, chromium, nickel, gold, platinum, palladium, copper, zinc, mixtures, and alloys thereof.

13. The powder coating composition of claim 5, wherein the coated substrates of the pearlescent pigments are additionally coated envelopingly with at least one outer protective layer comprising metal oxide; metal hydroxide; metal oxide hydrate of metals selected from the group consisting of silicon, aluminum, cerium, manganese, zirconium, and mixtures thereof; or a combination thereof; the at least one organic phosphorus compound of the general formula (I); (II); or a combination thereof being applied to the outer, enveloping protective layer.

14. The powder coating composition of claim 1, wherein the pearlescent pigments are composed of a single, platelet-shaped material, the material being selected from the group consisting of bismuth oxichloride, $TiO_2$, $Fe_2O_3$, and mixtures thereof.

15. The powder coating composition of claim 1, wherein the pearlescent pigments have one or more layers comprising color pigments.

16. The powder coating composition of claim 10, wherein said at least one metal oxide of low refractive index is selected from the group consisting of $SiO_2$, $Al_2O_3$, and mixtures thereof.

17. The powder coating composition of claim 5, wherein the metal chalcogenide is a metal oxide.

18. The powder coating composition of claim 5, wherein the substrates of the pearlescent pigments have been coated with one layer comprising a metal oxide.

19. A dry powder coating composition comprising:
powder coating binder; and
pearlescent pigments, each pearlescent pigment having over a surface thereof at least one organic phosphorus compound of the general formula (I)

$$R^1R^2P(O)(OR^3) \qquad (I)$$

where
$R^1$ and $R^2$ independently of one another are hydrogen or an organic radical having 1 to 30 carbon atoms, with the proviso that $R^1$ and $R^2$ are not simultaneously hydrogen;
wherein said dry powder coating composition includes 0.1% to 12% of surface modified pearlescent pigments by weight and 88% to 99.9% of powder coating binder by weight, said surface modified pearlescent pigments and said powder coating binder being bonded, wherein said surface modified pearlescent pigments and said powder coating binder are bonded by mixing and heating up to the softening temperature of said powder coating binder, and wherein said dry powder coating composition when applied exhibits a higher chroma value than a powder coating composition containing an identical amount of said pearlescent pigment without an organic phosphorus compound of the general formula I over a surface thereof.

20. A powder coating composition according to claim 19, wherein said organic phosphorous compound further comprises a compound having the general formula, $$R^1P(O)(OR^3)(OR^4) \qquad (II),$$

wherein $R^3$ and $R^4$ independently of one another are H or alkyl having 1-10 carbon atoms.

21. The powder coating composition of claim 1, wherein the pearlescent pigments include substrates comprised of glass flakes.

22. The powder coating composition of claim 1, wherein the pearlescent pigment includes a substrate selected from the group consisting of talc, sericite, kaolin, glass, graphite, $Al_2O_3$.

* * * * *